(12) United States Patent
Rajagopalan

(10) Patent No.: US 8,471,867 B2
(45) Date of Patent: Jun. 25, 2013

(54) METHOD AND SYSTEM FOR ANTI-ALIASING CLIPPED POLYGONS AND POLYLINES

(75) Inventor: Ramgopal Rajagopalan, Waterloo (CA)

(73) Assignee: Research In Motion Limited, Waterloo (CA)

( * ) Notice: Subject to any disclaimer, the term of this patent is extended or adjusted under 35 U.S.C. 154(b) by 922 days.

(21) Appl. No.: 12/580,583

(22) Filed: Oct. 16, 2009

(65) Prior Publication Data

US 2011/0090245 A1  Apr. 21, 2011

(51) Int. Cl.
*G09G 5/00* (2006.01)

(52) U.S. Cl.
USPC .......................................................... 345/620

(58) Field of Classification Search
None
See application file for complete search history.

(56) References Cited

U.S. PATENT DOCUMENTS

| | | | |
|---|---|---|---|
| 4,731,606 A | 3/1988 | Bantz et al. | |
| 6,359,630 B1 | 3/2002 | Morse et al. | |
| 8,207,988 B2 * | 6/2012 | Rajagopalan | 345/620 |
| 2005/0270311 A1 | 12/2005 | Rasmussen et al. | |
| 2007/0263007 A1 | 11/2007 | Robotham et al. | |

OTHER PUBLICATIONS

International Search Report and Written Opinion of the International Searching Authority dated Jan. 14, 2010 issued from corresponding application No. PCT/CA2009/001485.

\* cited by examiner

*Primary Examiner* — Ryan R Yang
(74) *Attorney, Agent, or Firm* — Geoffrey deKleine; Borden Ladner Gervais LLP

(57) ABSTRACT

A method for rendering static graphics in a mobile device in applications such as map applications. Panning increments are received for panning a previously rendered frame to a panned frame. A rendering region is defined based on the panning increments and the rendering region is expanded to provide an expanded region. At least one of a candidate polygon, candidate line segment, and polyline is clipped to the expanded region to obtain one or more clipped portions of the at least one of the candidate polygon, candidate line segment and candidate polyline contained within the expanded region. The one or more clipped portions of the candidate polygon, candidate line segment and candidate polyline, are rendered and portion of the previously rendered frame is copied to provide the panned frame.

17 Claims, 13 Drawing Sheets

US 8,471,867 B2

METHOD AND SYSTEM FOR ANTI-ALIASING CLIPPED POLYGONS AND POLYLINES

CROSS-REFERENCE TO RELATED APPLICATIONS

The present application claims the benefit of priority of U.S. Provisional Patent Application No. 61/106,846, filed Oct. 20, 2008, which is incorporated herein by reference.

TECHNICAL FIELD

The present application relates graphics rendering. In particular, the present application relates to a method and system for reducing aliasing artifacts introduced in fast clipping of polygons and polylines in rendering static graphic images.

BACKGROUND DISCUSSION

Polygon and line clipping methods and algorithms are well known in the field of computer graphics. In computer graphics, clipping refers to an operation where only portions of the vector or raster image that are visible to the user are drawn. This can save processing time on parts of the image that do not fall into any visible region of the display. For 2D vector graphics data, such as polygons and lines, clipping consists of deciding which of the vector data will be completely visible, completely invisible or partially visible. For the former two cases, the system either completely draws or throws away the respective geometry and for the partially visible case, the geometry is 'cut' such that only the visible portion is drawn. For example, a line segment may be intersected with the visible boundary of the display to come up with a shorter line segment which is completely contained within the bounds of the display. Hence clipping is used to accelerate the time taken to render graphics to the display.

Well known polygon clipping methods include the Sutherland-Hodgman method of clipping a candidate polygon against a rectangular clipping window, and the Maillot or Liang-Barsky methods of clipping a polygon in relation to nine regions within a clipping plane. While these methods are effective, they still require significant computational resources and time to render each new frame. This is of particular concern in mobile devices where new and more powerful graphics applications are being deployed, and where computational resources and power usage are at a premium.

Well known line clipping methods include the Cohen-Sutherland method, in which, for rectangular windows, the four edges of the clip window are extended, and nine regions are created from their intersection, of which only the middle region (viewport) is visible. The Cohen-Sutherland method includes, excludes or partially includes lines based on the regions in which the endpoints lie. The Liang-Barsky line clipping method is another popular line clipping algorithm. It uses the parametric equation of a line and inequalities describing the range of the clipping window to determine the intersections between the line and the clipping rectangle. While these methods are effective, they still require significant computational resources and time to render each new frame. This is of particular concern in mobile devices where new and more powerful graphics applications are being deployed, and where computational resources and power usage are at a premium.

Improvements in methods and systems of clipping geometry including polygons and lines are desirable.

BRIEF DESCRIPTION OF THE DRAWINGS

Embodiments of the present application will now be described, by way of example only, with reference to the attached Figures, wherein.

DETAILED DESCRIPTION

Figure 1:
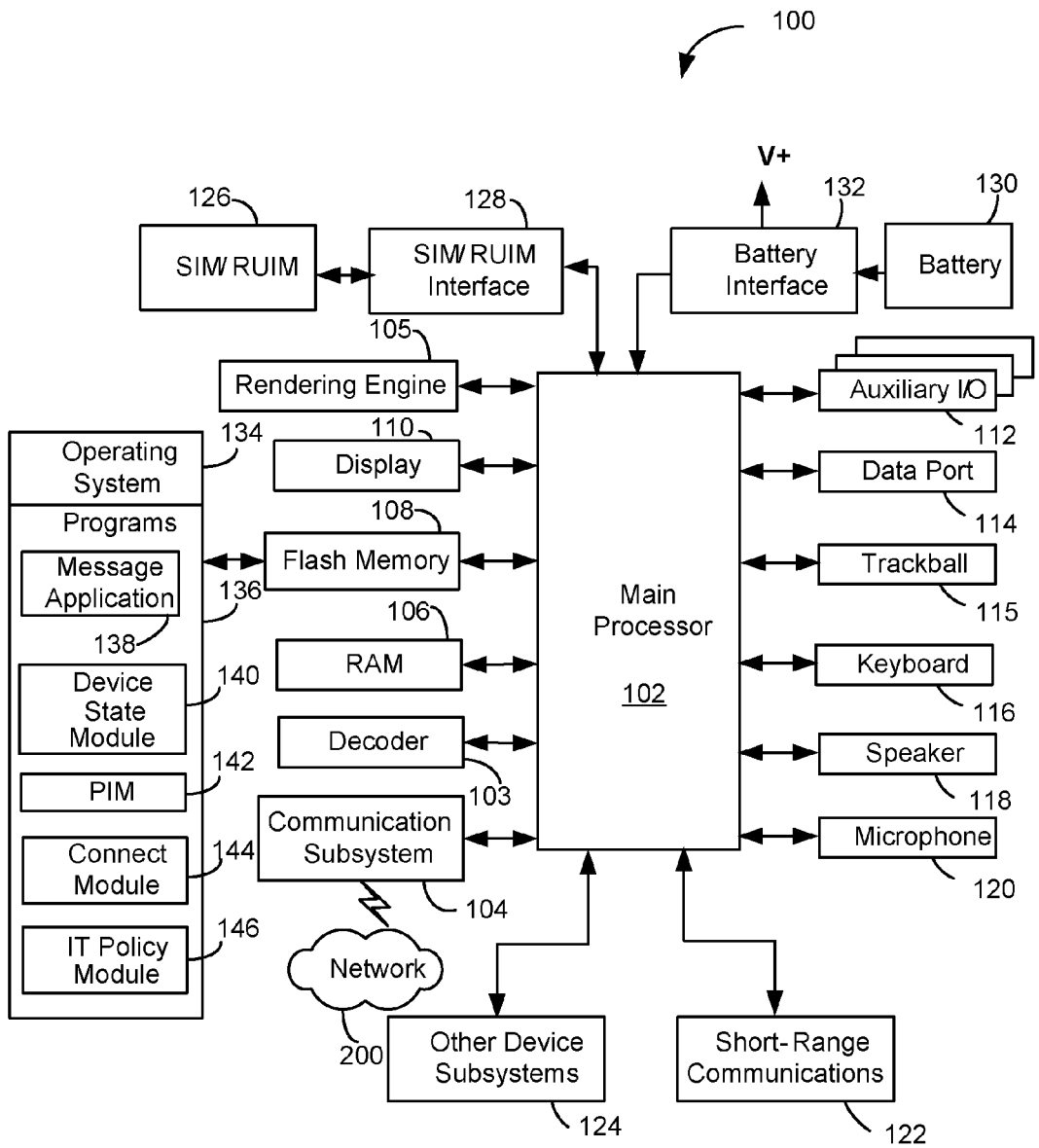
FIG. 1 is a block diagram of an exemplary embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to portable electronic devices. Examples of portable electronic devices include mobile or handheld wireless communication devices such as pagers, cellular phones, cellular smartphones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this exemplary embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a trackball 115, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 115 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM/RUIM card 126 is a type of a conventional "smart card" that can be used to identify a subscriber of the portable electronic device 100 and to personalize the portable electronic device 100, among other things. In the present embodiment, the portable electronic device 100 is not fully operational for communication with the wireless network 200 without the SIM/RUIM card 126. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be provided on the portable electronic device 100 and still others can be installed on the portable electronic device 100. Such software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102, in conjunction with a rendering engine 105, which can be provided in hardware, software or a combination thereof, will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
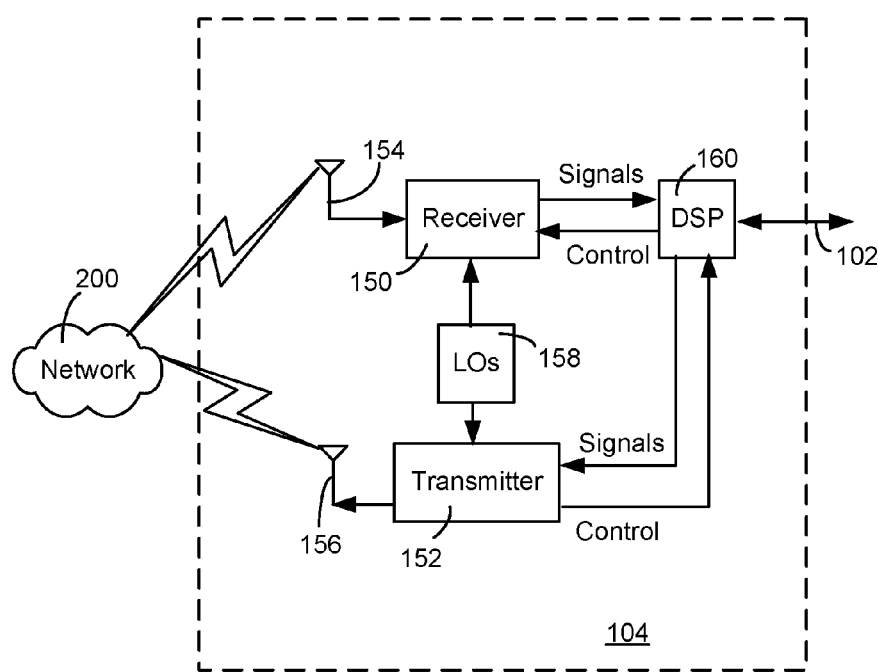
FIG. 2 is an exemplary block diagram of a communication subsystem component of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
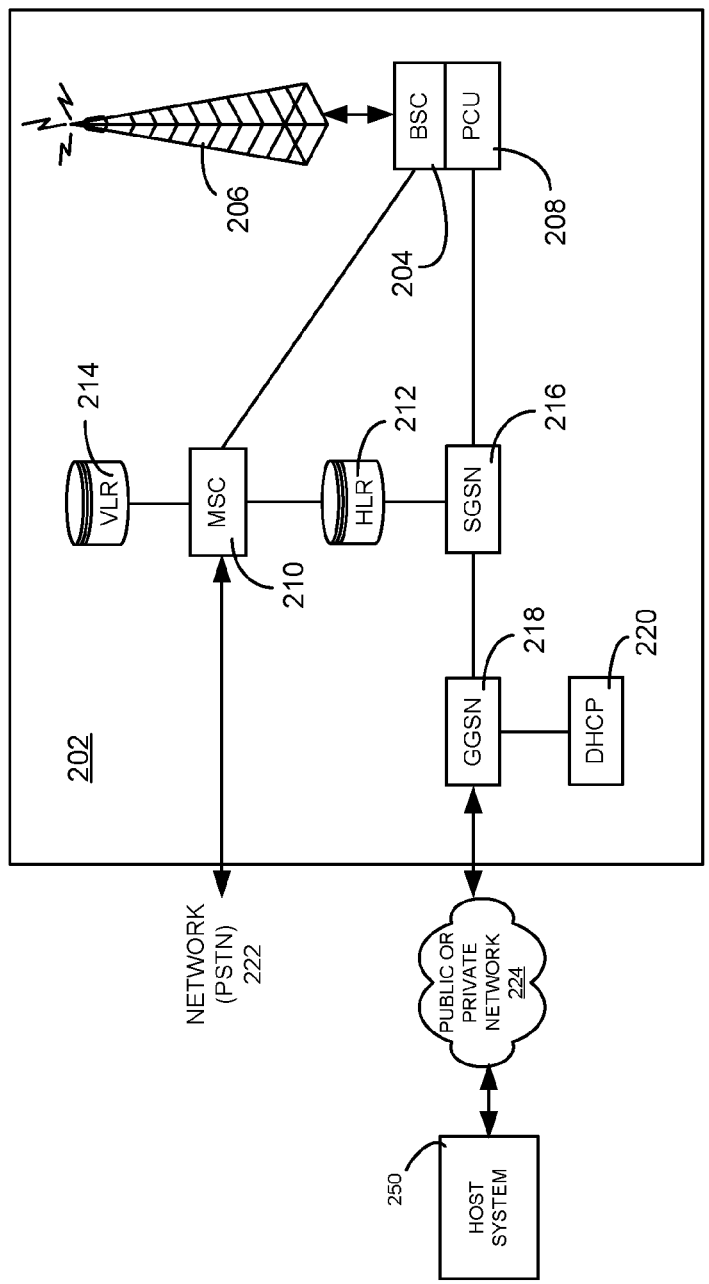
FIG. 3 is a block diagram of an exemplary implementation of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
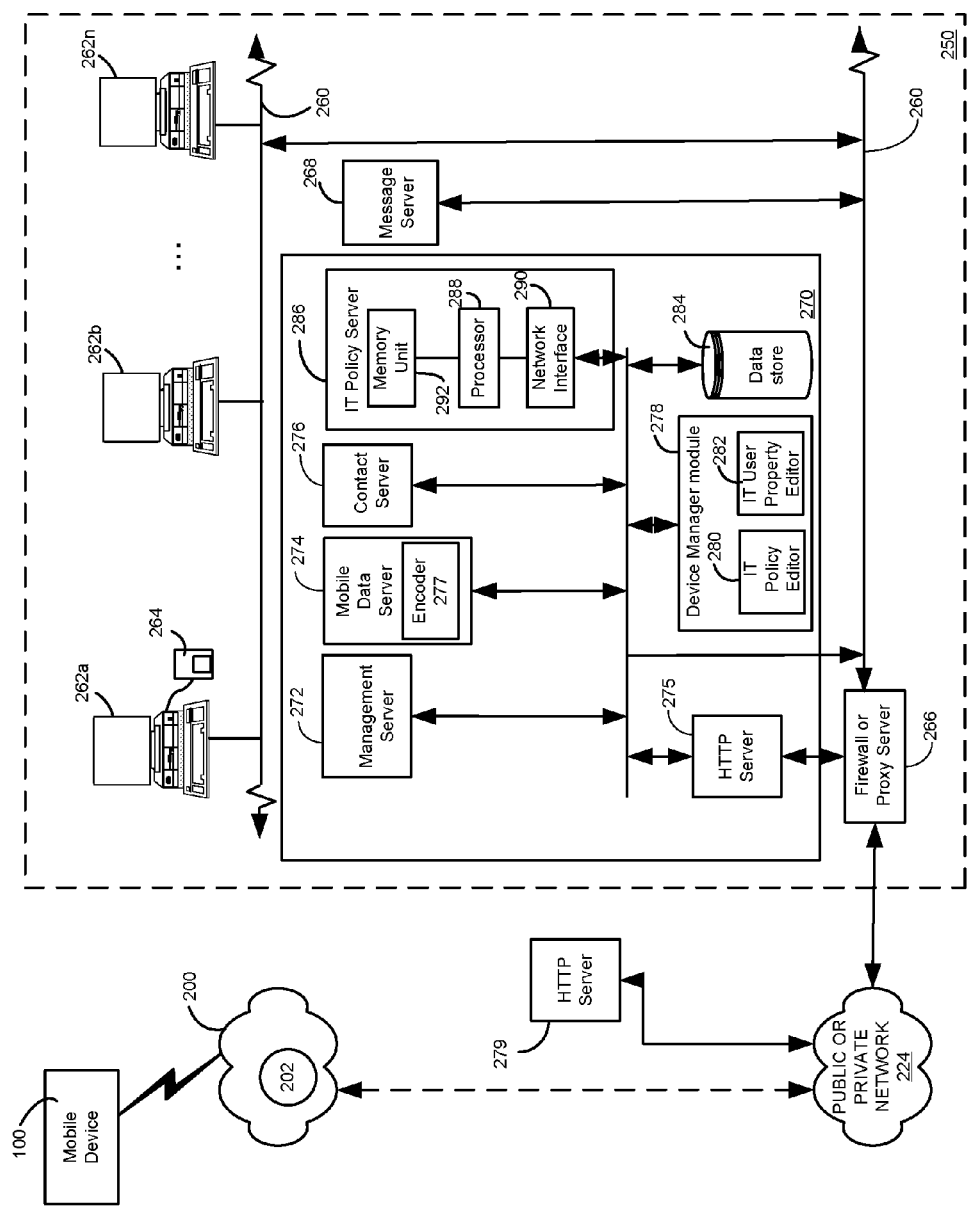
FIG. 4 is a block diagram illustrating components of an exemplary configuration of a host system with which the portable electronic device can communicate.

Referring now to FIG. 4, shown therein is a block diagram illustrating components of an exemplary configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262*b* within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server provides additional functions including PIM functions such as calendaring, contacts and tasks and supports data storage.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262*a* may request the e-mail messages associated with that user's account stored on the data store associated with the message server 268. These messages are then retrieved from the data store and stored locally on the computer 262*a*. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some predefined time interval, or upon the occurrence of some predefined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may comprise multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

As indicated above, the portable electronic device 100 includes the Personal Information Manager (PIM) 142 that includes functionality for organizing and managing data items of interest to the user, such as, but not limited to, e-mail, contacts, calendar events, voice mails, appointments, and task items. PIM applications include, for example, calendar, address book, tasks and memo applications.

The graphics in an application such as a map application are represented as polygons and line segments. These are rendered onto the screen with different colors and stroking schemes to display a geographic location. In such applications, a user generally pans (horizontal and/or vertical translational movement) through a vast 2-dimensional (2D) space containing the polygons and line segments or portions thereof. As the underlying polygons and line segments defining the 2D space do not change, the present method focuses on rendering only the newly exposed, or "clipped", portions.

Figure 5:
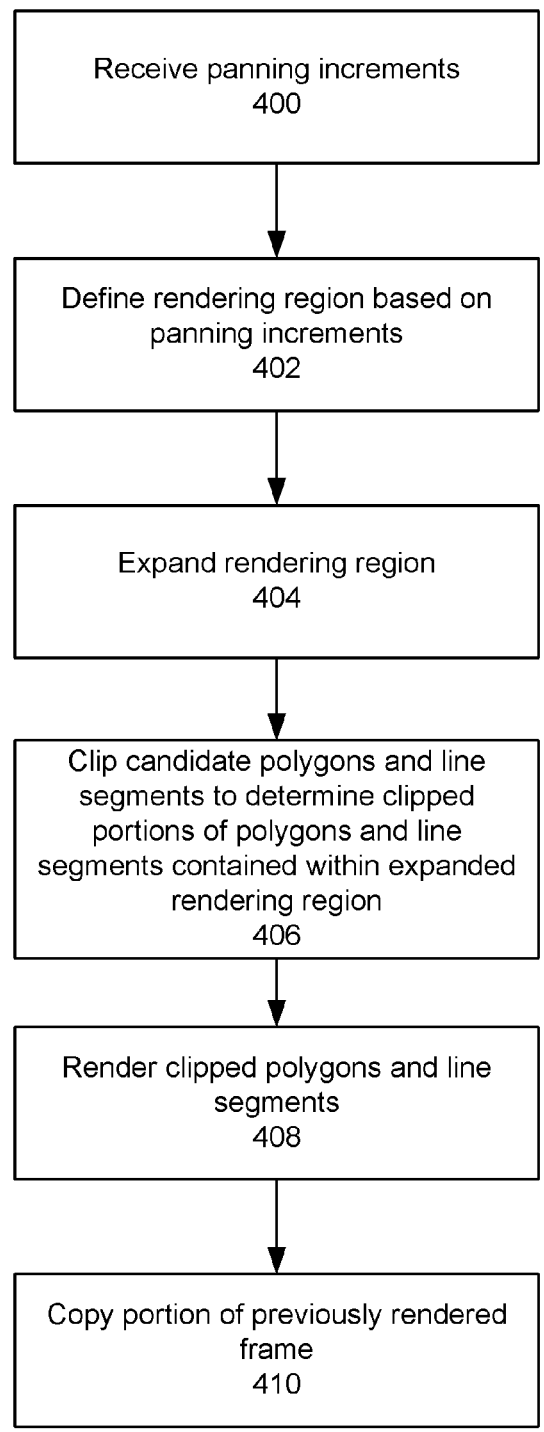
FIG. 5 is a flowchart of an exemplary method.

FIG. 5 is a flowchart of the present method. Generally, the present method provides a method of static graphics rendering in a mobile device. As used herein, a "static" rendering application is defined as a rendering application with no animation content in the rendered scene, such as map and other geographical display applications. In other words, the rendered scene is relatively static from one image frame to the next frame, and there are no moving objects in the scene. Panning increments are received for panning a previously rendered frame to a panned frame (step 400). As used herein, "panning" refers to the action of scanning across an image on a display of the mobile device 100. Panning across an image results in translation of the image in the horizontal and/or vertical directions, and may result in the display of previously hidden portions of the image. "Panning increments" refer to the incremental changes in the horizontal and/or vertical coordinates of the image resulting from the panning operation.

A rendering region is then defined based on the panning increments (step 402). The "rendering region" is a generally L-shaped region in the 2D plane, also referred to herein as the L-region, that includes only the portion of the image that was previously unrendered. The L-shaped region has inner horizontal and vertical boundaries that are collinear with respective horizontal and vertical boundaries of the previously rendered frame and outerboundaries collinear with respective horizontal and vertical boundaries of the panned frame.

The rendering region is expanded in all directions to provide an expanded region (step 404). An expanded region is created, for example, by moving each of the bounding lines of the rendering region outwardly, with each line moved in a direction perpendicular to the respective line. The amount in pixel or screen units by which the bounding lines are moved is referred to herein as the "overdraw width". For the purpose of this example, the same overdraw width is utilized for each of the bounding lines. The overdraw width may vary for the bounding lines, however. A candidate polygon is then clipped against the expanded region to create zero or many clipped polygons within the rendering region (step 406). A candidate polyline or line segment is then clipped against the expanded region to create zero or many clipped line segments (step 406). The clipped polygons and line segments can then be rendered (step 408), and a portion of the previously rendered frame can be copied (step 410), to provide the panned frame. The method can be performed by the rendering engine 105, shown in FIG. 1.

Embodiments of the present method can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The clipping of geometry including polylines and polygons includes the determination of the intersection of line segments contained within the L-shaped region. The intersection point of line segments that intersect with the L-shaped region boundaries is computed and used for rendering of shapes. The computation of the intersection point is based on an integer space in that the intersection points are rounded to the nearest integer. Thus, a computed intersection point may not lie on the actual line segment. Since the clipping of geometry is carried out for L-region rendering using computed intersection points that may not lie on the actual line segments, an intersection error may be introduced each time a new L-region is rendered and a portion of the previous frame copied over to the new frame which can result in aliasing artifacts in the form of choppy line-segments. The intersection error is 0 for horizontal and vertical lines while the error is maximum for a line with a slope of absolute value of 1. The present method reduces aliasing effects introduced in such graphics rendering by expanding the L-region, for example, expanding in each direction, prior to copying over the bitmap of the previously rendered frame and determining intersection points based on the expanded L-region. With an overdraw width of 20 pixel units, for example, aliasing artifacts can be reduced by over 35%, which is negligibly detected by the human eye.

Figure 6:
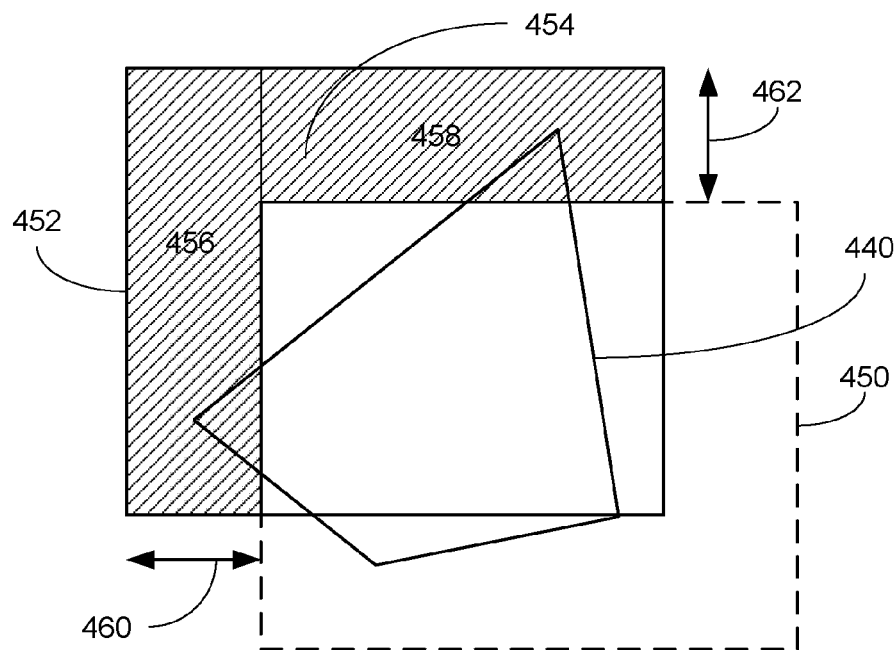
FIG. 6 illustrates a panning operation.

Embodiments of the present method will now be described with reference to FIGS. 6-10. FIG. 6 shows a candidate polygon 440 over which a user can pan a frame. The panning operation results in a previously rendered frame 450 being shifted to a desired new view, as indicated by the panned frame 452. The panning operation can consist of a vertical pan, followed optionally by a horizontal pan, or vice versa, or can consist of simultaneous movement in both horizontal and vertical directions. A resultant rendering region, shown as shaded L-region 454, is defined by the panning operation.

The L-region 454 is by definition two rectangles, as shown, that combine to give the shape of an "L" on the screen. Each rectangle 456, 458 represents a refresh region of the screen display, and is defined by the horizontal and vertical panning increments, indicated by the arrows 460 and 462.

Once the user performs the panning operation, the horizontal and vertical panning increments are captured or received (step 400), and are used to compute the L-region 454, which represents the effective refresh region on the screen (step 402).

Figure 7:
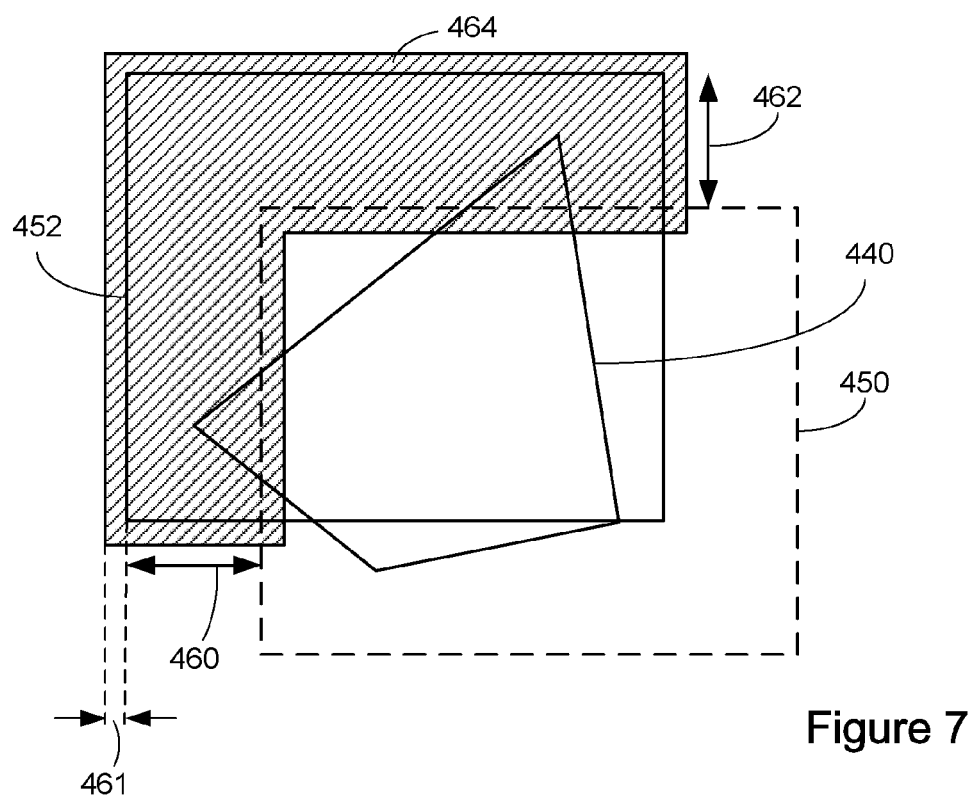
FIG. 7 illustrates expansion of an L-shaped region.

The computed L-region 454 is then expanded by moving each of the 6 boundaries or sides defining the L-region 454 uniformly outwardly by a predetermined number of pixels and extending each of the six line segments to meet at corners of the expanded L-region 464, as shown in FIG. 7 (step 404). For example, each of the sides can be moved 20 pixels outwardly, as illustrated by the overdraw width 461, and the sides are extended to provide the expanded L-region 464.

Figure 8:
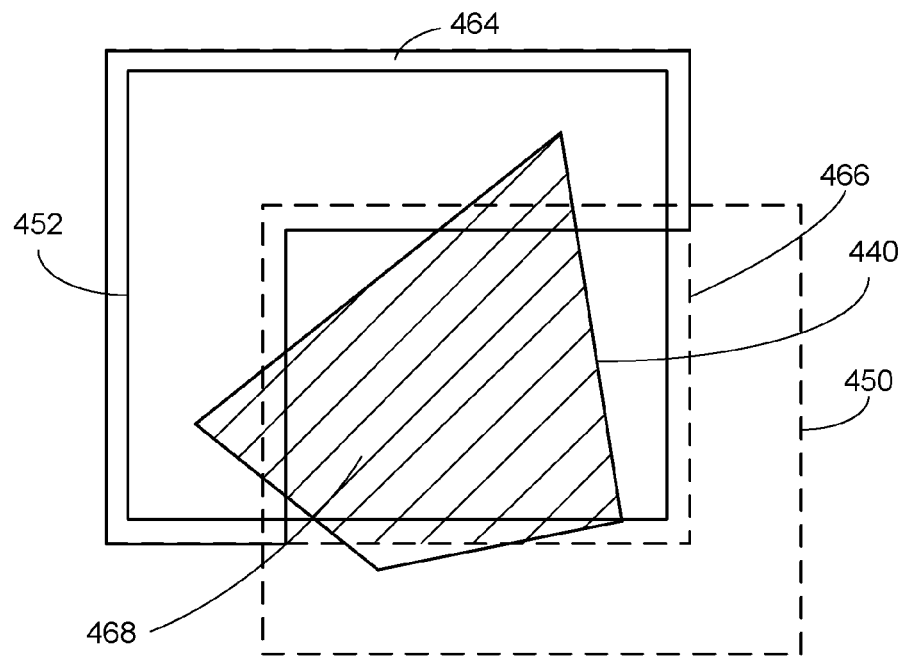
FIG. 8 illustrates rectangular clipping of a polygon.

To clip the polygon 440 in accordance with the expanded L-region 464 (step 406), a conventional rectangular clipping method, such as the Sutherland-Hodgman method, is applied to the polygon 440. This step is illustrated in FIG. 8, where the expanded L-region 464 defines the boundaries of the rectangular clipping window 466 used in the rectangular clipping operation. It should be noted that the bounds of the rectangular clipping window conform to the outer edges of the expanded L-region 464. The clipped polygon resulting from the rectangular clipping operation is shown by the hashed region 468 within the candidate polygon 440.

Figure 9:
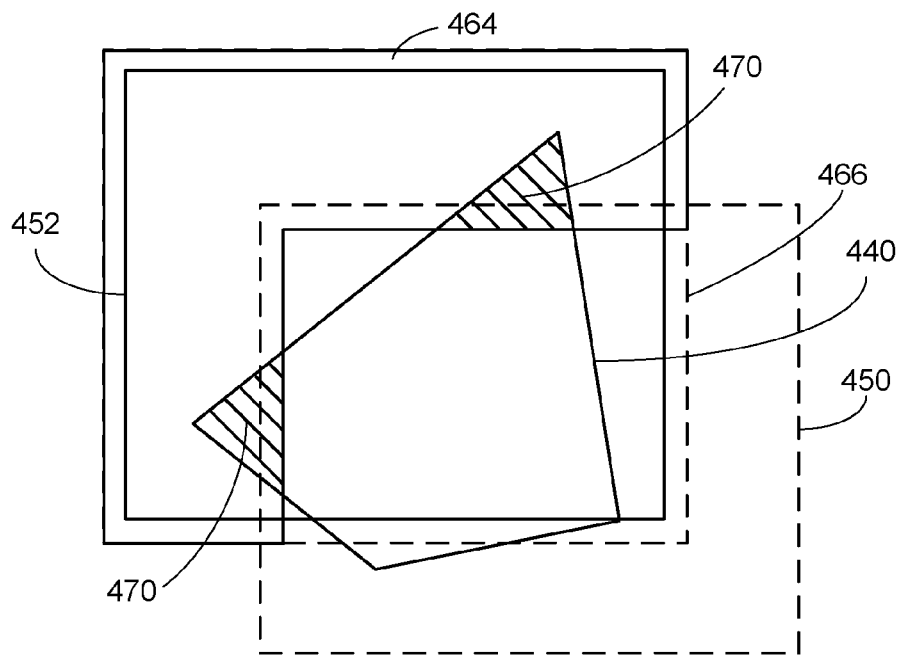
FIGS. 9-11 illustrate clipping a polygon against the expanded L-shaped region.

Once the polygon 440 is clipped to the rectangular clipping window 466, the resulting clipped polygon(s) 468 are in turn each clipped against the expanded L-region 464 to compute a set of L-region clipped polygon(s) 470, as shown shaded in FIG. 9. Once the set of expanded L-region clipped polygons 470 has been rendered (step 408), the portion of the previously rendered frame 450 that overlaps with the panned frame 452 can be derived or copied from the previously rendered frame 450, and added to the panned frame 450 (step 410). Thus, the portion of the previously rendered frame 450 that is added includes a portion that overlaps with and is rendered over a portion of the expanded L-region 464. This in effect reduces the total rendering needs of the refresh operation to the expanded L-region 464. With a portion of the previously rendered screen 450 rendered over the portion of the expanded L-region 464, the aliasing artifacts are reduced. The greater the overlap with the expanded L-region 464, the lesser the aliasing artifacts.

Figure 10:
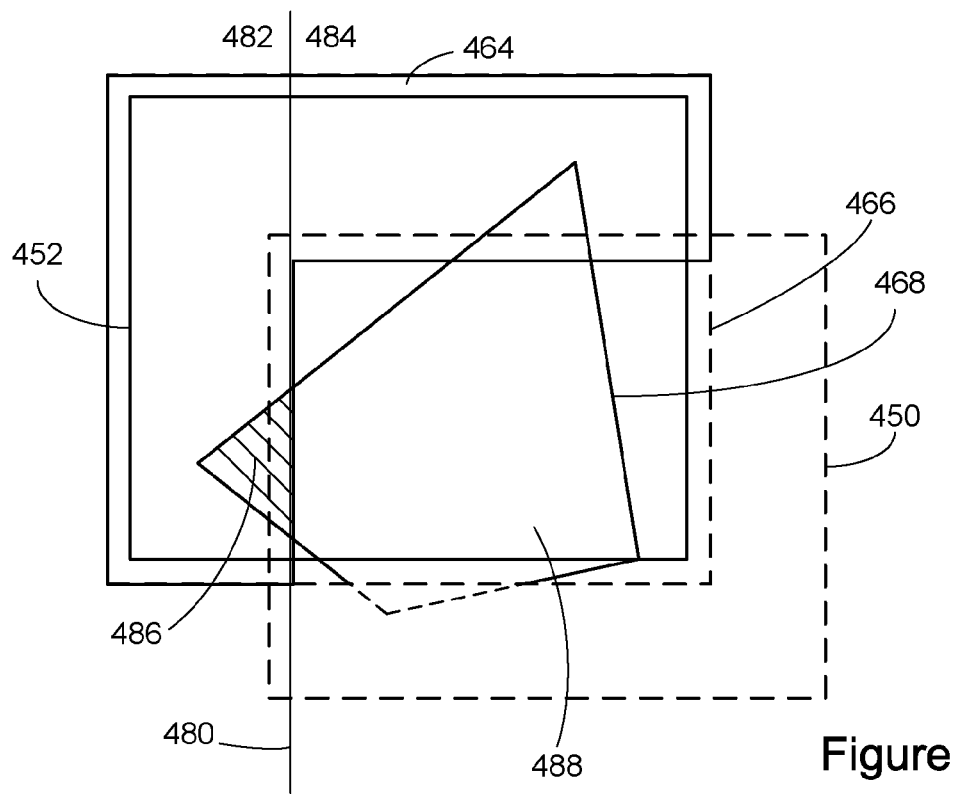
Figure 11:
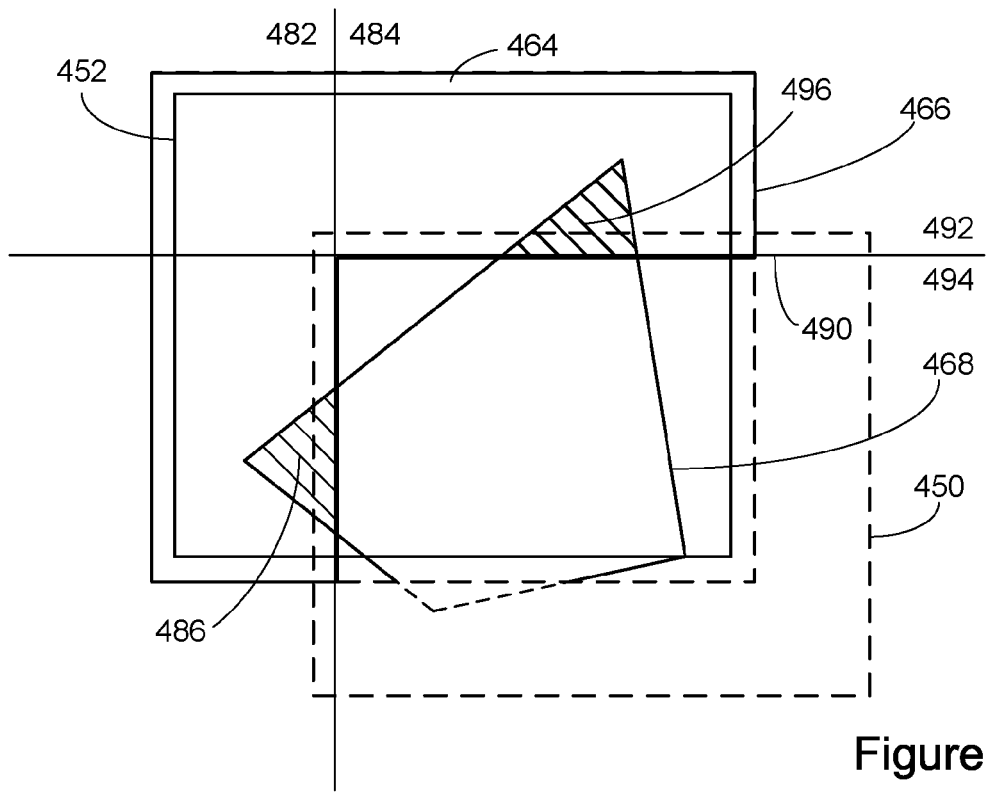

One embodiment for clipping the polygon(s) 468 against the expanded L-region 464 is shown in FIGS. 10 and 11. After the rectangular clipping operation against the rectangular clipping window 466 that includes the expanded L-region 464, the clipped polygon 468 is subjected to two consecutive operations. In the first operation, illustrated in FIG. 10, the clipped polygon is first split with respect to the vertical interior axis 480 of the expanded L-region 464. The axis 480 is extended to divide the 2D plane into two half-planes 482 and 484, and the clipped polygon 468 is split into two split polygons 486 and 488. That portion of the clipped polygon 468 that lies on the side of the axis within the expanded L-region 464 (i.e. split polygon 486) is retained or accepted for rendering, and can be rendered immediately without further clipping. That portion which lies to the other side of the axis (i.e. split polygon 488) is further processed, as described below.

The split polygons that come to the right side of the vertical axis 480 after the split operation, such as split polygon 488, may still lie at least partially within the expanded L-Region, namely to the right of the axis 480, in the half plane 484 and above the axis 490. Hence, a further clipping operation is performed on the non-accepted split polygon 488, as shown in FIG. 11. This clipping operation is performed with respect to the interior horizontal axis 490 of the expanded L-region 464. The horizontal interior axis 490 is taken and extended to form a line which divides the 2D plane into two planes 492 and 494. The non-accepted split polygon 488 is clipped against the line 490. A polygon is said to be clipped with respect to a line when it is split with respect to the line, and the newly created polygons on one side of the line are retained or accepted, and those on the other are rejected and discarded. In the illustrated example, the clipped polygon 496 above the line 490, that falls within the expanded L-region 464, is retained for rendering, and the portion of split polygon that falls below line 490 is discarded.

As will be appreciated, with these steps, a polygon can be clipped against the expanded L-shaped region, and only those portions of the polygon that fall within the expanded L-shaped region are retained for rendering. The expanded L-region is a fraction of the total area of the display. Thus, rendering of polygons can be substantially accelerated when compared to other methods that clip polygons against boundaries of the panned frame, and render the newly clipped polygon. Each clipping operation includes the determination of the intersection of line segments contained within the expanded L-shaped region. The intersection point of line segments that intersect with the expanded L-shaped region boundaries is computed and used for rendering of shapes. While polygons are clipped against the expanded L-shaped region, portions of which are not rendered on the display or are copied over, aliasing artifacts are reduced as compared to rendering based on clipping against the L-region without expanding.

Figure 12:
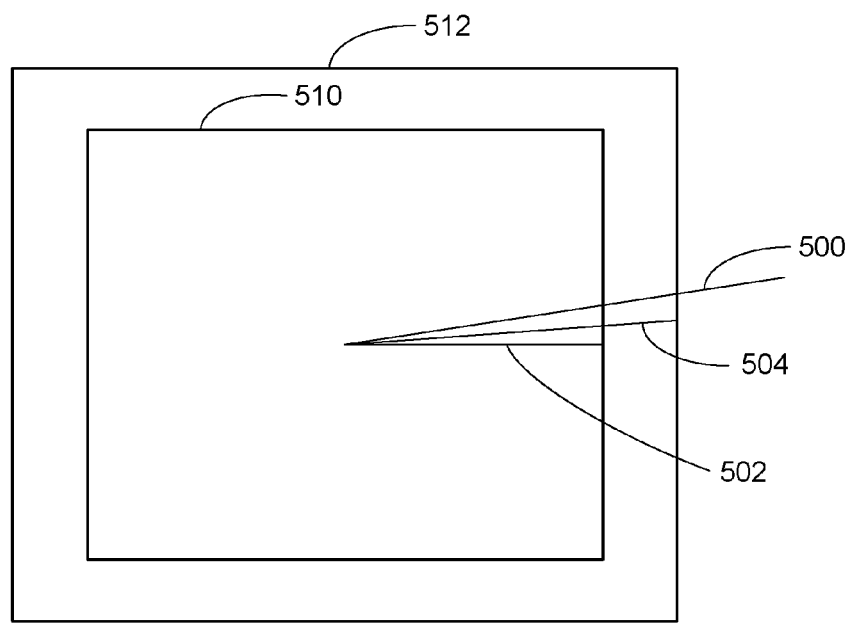
FIG. 12 illustrates error introduction in a clipping operation and the reduction of the error by expansion of the region to which a geometry is clipped.

Expanding the L-shaped region against which polygons and polylines are clipped, decreases the aliasing artifacts by decreasing the error introduced in determining intersection points when clipping. Referring to FIG. 12, an exemplary line 500 is shown which may be a line segment or a portion of a polygon for clipping. When determining the intersection point of the line 500 with the interior boundary 510 for clipping, the actual intersection point may be, for example, at a pixel co-ordinate position of (3,4.5). Since the intersection point is rounded to the nearest integer, the calculated intersection point with the interior boundary 510 is (3,4), as shown by the line 502. Using an expanded boundary 512 and determining the intersection point of the line 500 with the expanded boundary 512, the line segment 504 may be determined based on the rounded intersection point to provide the line 504. The line 504 when clipped to the expanded boundary 512 provides a line that is much closer to the actual line 500 when rendered.

Figure 13:
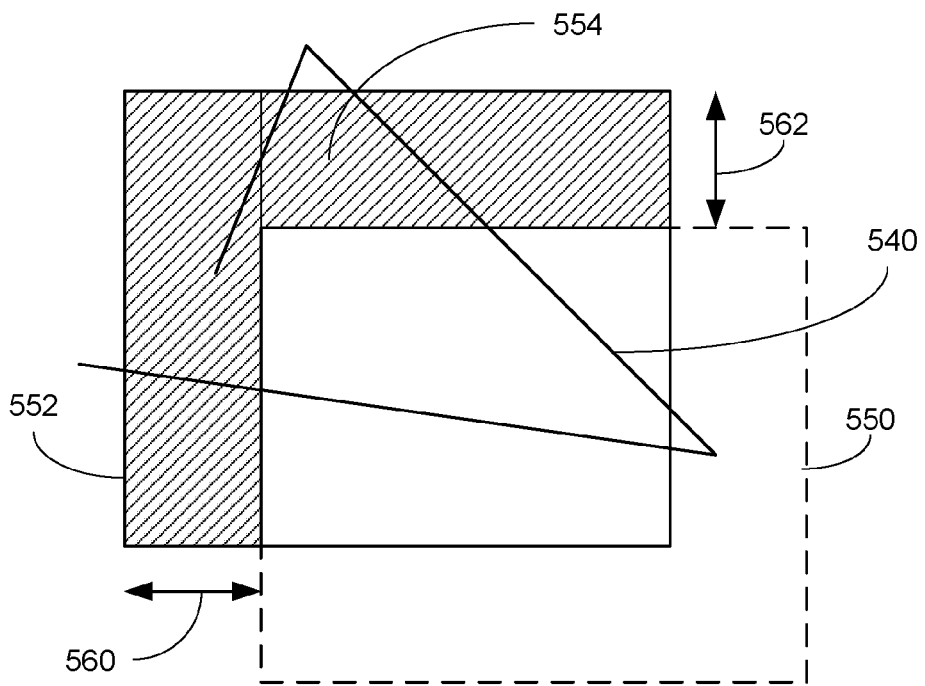
FIG. 13 illustrates another panning operation.

Further embodiments of the present method will now be described with reference to FIGS. 13-19. FIG. 13 shows a candidate polyline 540 over which a user can pan a frame. The panning operation results in a previously rendered frame 550 being shifted to a desired new view, as indicated by the panned frame 552. The panning operation can consist of a vertical pan, followed optionally by a horizontal pan, or vice versa, or can consist of simultaneous movement in both horizontal and vertical directions. A resultant rendering region, shown as shaded L-region 554, is defined by the panning operation.

As described above, the L-region 554 is by definition two rectangles, as shown, that combine to give the shape of an "L" on the screen and is defined by the horizontal and vertical panning increments, indicated by the arrows 560 and 562.

Once the user performs the panning operation, the horizontal and vertical panning increments are captured or received (step 400), and are used to compute the L-region 554, which represents the effective refresh region on the screen (step 402).

Figure 14:
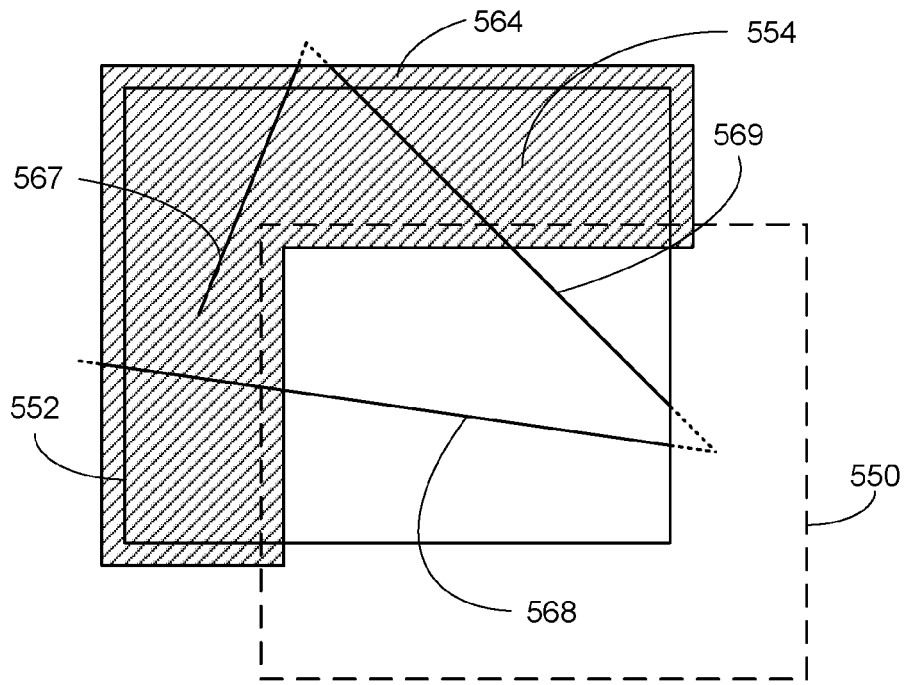
FIG. 14 illustrates expansion of an L-shaped region.

The computed L-region 554 is then expanded by moving each of the 6 boundaries or sides defining the L-region 554 uniformly outwardly by a predetermined number of pixels and extending each of the sides to meet at respective corners of the expanded L-region 564, as shown in FIG. 14 (step 404).

Figure 15:
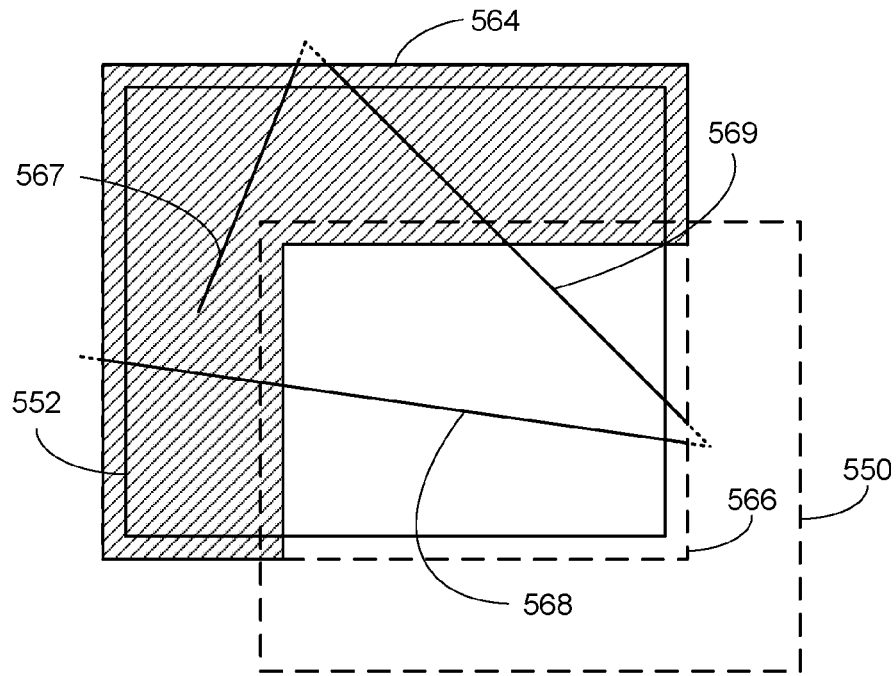
FIG. 15 illustrates rectangular clipping of a polyline.

To clip the polyline 540 in accordance with the expanded L-region 554, a conventional rectangular line clipping method, such as the Cohen-Sutherland method, is applied to the polygon 540 of FIG. 13. This step is illustrated in FIG. 15, where the expanded L-region 564 defines the boundaries of the rectangular clipping window 566 used in the line clipping operation. It should be noted that the bounds of the rectangular clipping window 466 conform to the outer edges of the expanded L-region 564. The clipped line segments resulting from the clipping operation are shown by the clipped line segments 567, 568, 569.

Figure 16:
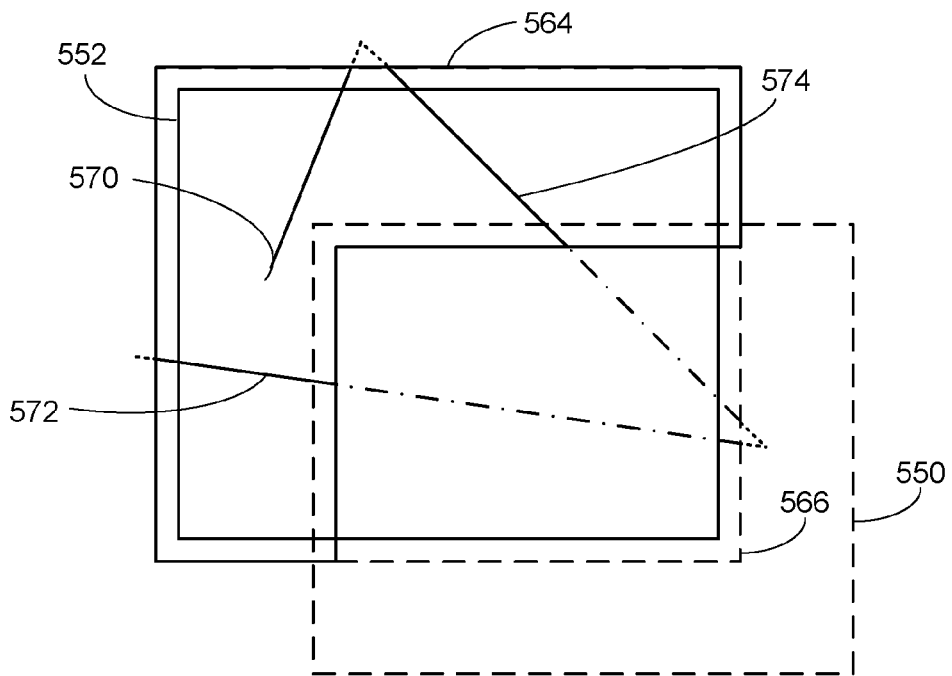
FIGS. 16-18 illustrate clipping a polyline against an L-shaped region.

Once the polyline 540 is clipped to the rectangular clipping window 466, the resulting clipped line segments 567, 568, 569 are in turn each clipped against the expanded L-region 564 to compute a set of expanded L-region clipped line segments 570, 572, 574, as shown in FIG. 16. The expanded L-region clipped line segments 570, 572, 574 represent the minimum number of screen pixels requiring a refresh to view the polyline 540 in the panned frame 552. As will be appreciated, once the set of expanded L-region clipped line segments 570, 572, 574 has been rendered, the portion of the previously rendered frame 550 that overlaps with the panned frame 552 can be derived or copied from the previously rendered frame 550, and added to the panned frame 550 (step 410). Thus, the portion of the previously rendered frame 550 that is added includes a portion that overlaps with and is rendered over a portion of the expanded L-region 564. The method described reduces the total rendering needs of the refresh operation to the expanded L-region 564. With a portion of the previously rendered screen 550 rendered over the portion of the expanded L-region 564, the aliasing artifacts are reduced. The greater the overlap with the expanded L-region 564, the lesser the aliasing artifacts.

Figure 17:
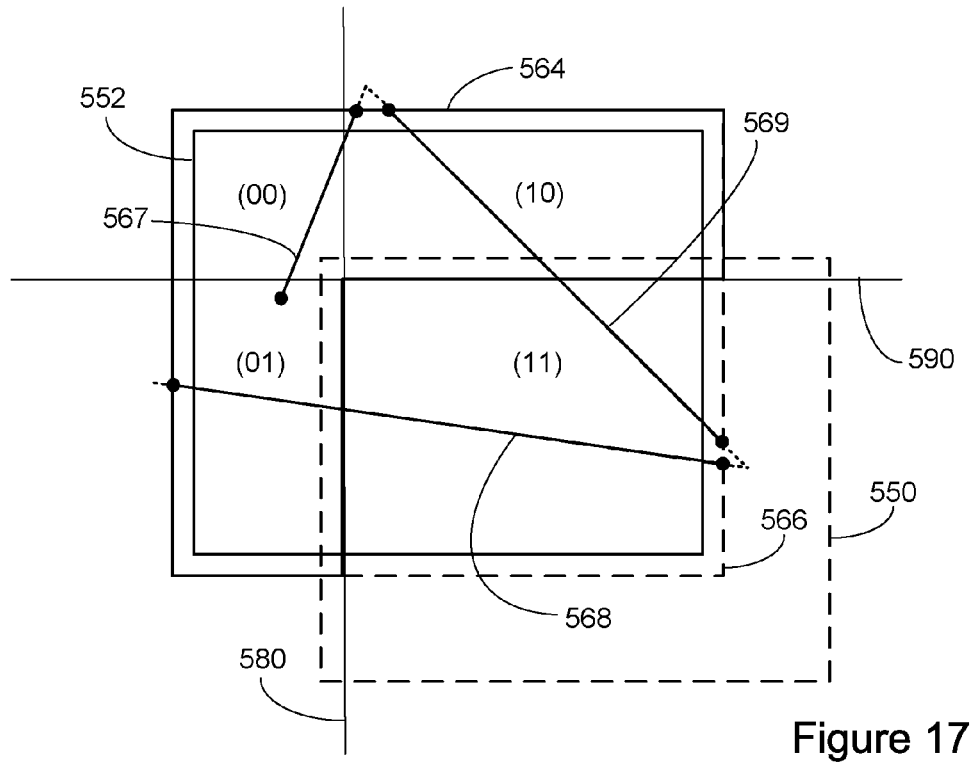
Figure 18:
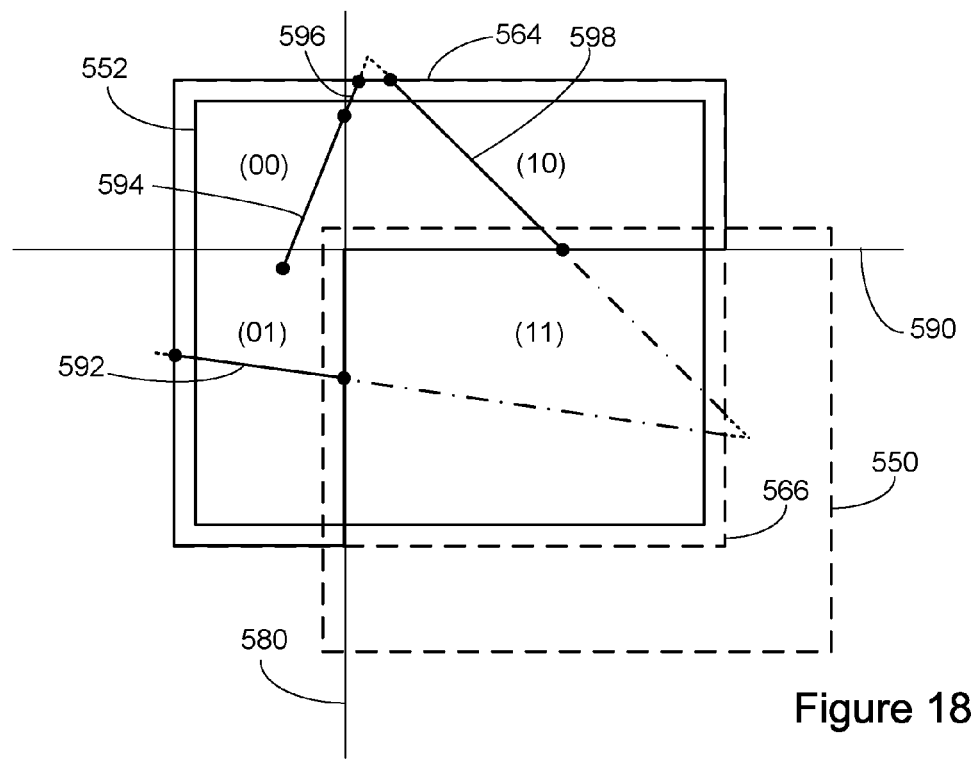

One embodiment for clipping the line segments 567, 568, 569 against the expanded L-region 554 will now be described with reference to FIGS. 17 and 18. For clipping line segments 567, 568, 569 to the expanded L-region 564, the 2D plane is first divided into four quadrants, and codes are assigned to each quadrant. A code is then computed for each end point of the candidate line segments 567, 568, 569. The computed codes permit each line segment 567, 568, 569 to be categorized as line segments intersecting with the expanded L-region boundaries; completely within the expanded L-region boundaries; or completely outside the expanded L-region boundaries. Line segments falling completely within or completely outside the expanded L-region can then be trivially accepted or rejected, respectively, for rendering.

To divide the 2D plane into quadrants or regions, the vertical and horizontal interior line segments 580 and 590 forming the expanded L-region are extended, and codes (00), (01), (11) and (10) are assigned to the respective regions. The first digit in the code represents the vertical component V, and the second digit represents the horizontal component H. The codes are assigned to the regions such that those regions falling within the expanded L-region 564 with respect to the vertical line 580 are assigned a vertical component of "0", and those falling outside the expanded L-region 564 with respect to the vertical line 580 are assigned a vertical component of "1". Similarly, horizontal components of the region codes are assigned such that those regions falling within the expanded L-region 564 with respect to the horizontal line 590 are assigned a horizontal component of "0", and those falling outside the expanded L-region 564 with respect to the horizontal line 590 are assigned a horizontal component of "1".

Codes are then computed for each endpoint of the candidate line segments 567, 568, 569. In the illustrated example shown in FIG. 9, the codes computed for the endpoints of line segment 567, 568, 569 are [P1(01), P2(10)]; [P1(01), P2(11)] and [P1(10), P2(11)], respectively. Once the VH codes are assigned to all the end points of the candidate line segments, each line segment is examined to first determine if it can be trivially accepted or rejected.

Figure 19:
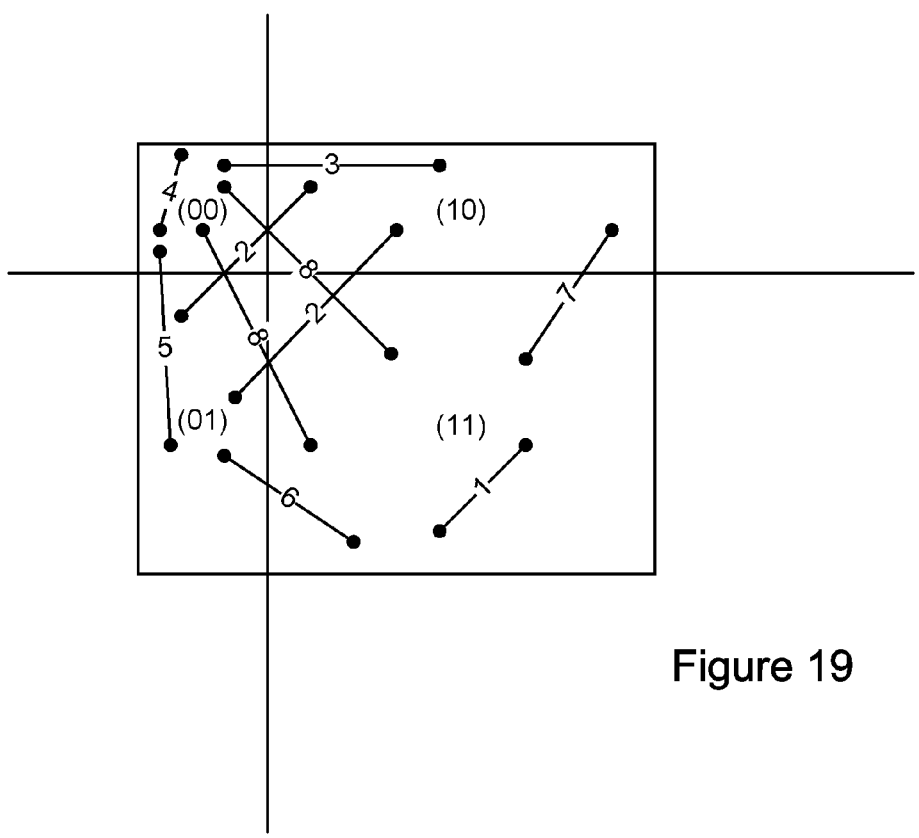
FIG. 19 shows the eight cases into which clipped line segments can fall.

As shown in FIG. 19, there are eight distinct cases for classifying a line segment. Each of these eight cases is shown by its respectively numbered line in FIG. 11:

Class 1: P1 (11) and P2 (11). This implies that both the points are outside the expanded LRegion.

Class 2: P1 (01) and P2 (10). This implies that P1 lies outside the horizontal region but inside the vertical region and vice versa for P2. This case has two subcases
   a. The line segment lies completely within the expanded L-region.
   b. The line segment P1P2 intersects the expanded L-region boundaries.

Class 3: P1 (00) and P2 (10). This implies that P1 is inside both the vertical and horizontal regions and P2 inside the horizontal region, which in turn means that the line segment is completely within the expanded L-region.

Class 4: P1 (00) and P2 (00). This implies that both P1 and P2 are inside both the vertical and horizontal regions hence the line segment is also completely within the expanded L-region.

Class 5: P1 (01) and P2 (00). This case is similar to case 3. The line segment is contained completely within the expanded L-region by virtue of the containment of P1 and P2 inside the vertical region.

Class 6: P1 (01) and P2 (11). This case implies that P1 is contained inside the vertical region and P2 outside the expanded L-region and hence the line segment P1P2 intersects the expanded L-region at the vertical boundary.

Class 7: P1 (10) and P2 (11). This case implies that P1 is contained inside the horizontal region and P2 outside the expanded L-region and hence the line segment P1 P2 intersects the expanded L-region at the horizontal boundary.

Class 8: P1 (00) and P2 (11). This case implies that P1 is contained inside the horizontal as well as the vertical region and P2 outside both and hence the line segment P1P2 intersects the expanded L-region at either the horizontal or the vertical boundary. This case can also be considered a sub-class of classes 7 and 8.

A line segment classified as belonging Class 1 can be trivially rejected, and line segments classified as belonging to Classes 3, 4 or 5 can be trivially accepted for rendering. Line segments classified in the remaining classes require further processing to determine the portion required to be rendered or refreshed.

As can be seen from the illustrated example, line segments 567, 568, 569 are classified in Classes 2, 6 and 7, respectively. Hence, further clipping operations are performed on the each of the line segments, as shown in FIG. 18. The line segments 567, 568, 569 are first clipped with respect to the vertical line 480 of the expanded L-region 564. A line segment is said to be clipped with respect to a line when it is split with respect to the line, and the newly created line segments on one side of the line are retained or accepted. Those portions of the line segments 567, 568, 569 that lie on the side of the line 480 within the expanded L-region 564 (i.e. clipped line segments 592 and 594) can be retained or accepted for rendering, and can be rendered immediately without further clipping. Those portions which lie to the other side of the line 590 are further processed by performing another clipping operation with respect to the interior horizontal line 590 of the expanded L-region 564, discarding those newly clipped line segments that fall outside the expanded L-region 564 and retaining or accepting those that fall within the expanded L-region 564. In the illustrated example, this results in further accepting newly clipped line segments 596 and 598.

A method for rendering static graphics in a mobile device in applications such as map applications is provided. Panning increments are received for panning a previously rendered frame to a panned frame. A rendering region is defined based on the panning increments and the rendering region is expanded to provide an expanded region. At least one of a candidate polygon, candidate line segment, and polyline is clipped to the expanded region to obtain one or more clipped portions of the at least one of the candidate polygon, candidate line segment and candidate polyline contained within the expanded region. The one or more clipped portions of the candidate polygon, candidate line segment and candidate polyline, are rendered and portion of the previously rendered frame is copied to provide the panned frame.

A mobile device includes a rendering engine for performing the above method.

A computer readable medium has computer-readable code embodied therein. The computer-readable code is executable by at least one processor at a computing device to cause the at least one processor to receive panning increments for panning a previously rendered frame to a panned frame, define a rendering region based on the panning increments, expand the rendering region to provide an expanded region, clip, to the expanded region, at least one of a candidate polygon, candidate line segment and candidate polyline to obtain one or more clipped portions of the at least one of the candidate polygon, candidate line segment and candidate polyline contained within the expanded region, and render the one or more clipped portions of the candidate polygon, candidate line segment and candidate polyline, and copy a portion of the previously rendered frame, to provide the panned frame.

As indicated above, lines and polylines are clipped against the expanded L-shaped region. Although portions of the lines and polylines are not rendered on the display or are copied over, aliasing artifacts are reduced as compared to rendering based on clipping against the L-region without expanding. Expanding the L-shaped region against which polygons, lines and polylines are clipped, decreases the aliasing artifacts by decreasing the error introduced in determining intersection points when clipping.

While the embodiments described herein are directed to particular implementations of the electronic device and method of controlling the electronic device, the above-described embodiments are intended to be examples. It will be understood that alterations, modifications and variations may be effected without departing from the scope of the present disclosure.

What is claimed is:

1. A method of static graphics rendering in a mobile device, comprising:
   receiving panning increments for panning a previously rendered frame to a panned frame;
   determining a rendering region based on the panning increments;
   expanding the rendering region to provide an expanded region;
   clipping, to the expanded region, at least one of a candidate polygon, candidate line segment and candidate polyline to obtain one or more clipped portions of the at least one of the candidate polygon, candidate line segment and candidate polyline contained within the expanded region; and
   rendering the one or more clipped portions of the candidate polygon, candidate line segment and candidate polyline, and copying a portion of the previously rendered frame, to provide the panned frame.

2. The method according to claim 1, wherein expanding the rendering region comprises expanding the rendering region in all directions.

3. The method according to claim 2, wherein expanding the rendering region in all directions comprises expanding the rendering region uniformly in all directions.

4. The method according to claim 1, wherein the panning increments comprise horizontal and vertical panning increments.

5. The method according to claim 4, wherein determining the rendering region comprises determining an L-shaped region having inner horizontal and vertical boundaries collinear with respective horizontal and vertical boundaries of the previously rendered frame and outer boundaries collinear with respective horizontal and vertical boundaries of the panned frame.

6. The method according to claim 5, wherein expanding the rendering region comprises moving each of the six line segments comprising boundaries of the L-shaped region, outwardly from the L-shaped region, and extending each of the six line segments to meet at corners of the expanded region.

7. The method according to claim 6, wherein moving each of the six boundaries comprises moving each of six boundaries of the L-shaped region by a predetermined number of pixels.

8. A mobile device comprising a rendering engine for performing the method of claim 1.

9. The method according to claim 1, wherein expanding the rendering region comprises expanding the rendering region by at least 20 pixel units in all directions.

10. A computer readable storage device having computer-readable code executable by at least one processor at a computing device to cause the at least one processor to:
  receive panning increments for panning a previously rendered frame to a panned frame;
  define a rendering region based on the panning increments;
  expand the rendering region to provide an expanded region;
  clip, to the expanded region, at least one of a candidate polygon, candidate line segment and candidate polyline to obtain one or more clipped portions of the at least one of the candidate polygon, candidate line segment and candidate polyline contained within the expanded region; and
  render the one or more clipped portions of the candidate polygon, candidate line segment and candidate polyline, and copy a portion of the previously rendered frame, to provide the panned frame.

11. The computer-readable storage device according to claim 10, wherein expanding rendering region comprises expanding in all directions.

12. The computer readable storage device according to claim 11, wherein expanding the rendering region in all directions comprises expanding the rendering region uniformly in all directions.

13. The computer readable storage device according to claim 10, wherein the panning increments comprise horizontal and vertical panning increments.

14. The computer readable storage device according to claim 13, wherein determining the rendering region comprises determining an L-shaped region having inner horizontal and vertical boundaries collinear with respective horizontal and vertical boundaries of the previously rendered frame and outer boundaries collinear with respective horizontal and vertical boundaries of the panned frame.

15. The computer readable storage device according to claim 14, wherein expanding the rendering region comprises moving each of the six line segments, comprising boundaries of the L-shaped region, outwardly from the L-shaped region, and extending each of the six line segments to meet at corners of the expanded region.

16. The computer readable storage device according to claim 15, wherein moving each of the six boundaries comprises moving each of six boundaries of the L-shaped region by a predetermined number of pixels.

17. The computer readable storage device according to claim 10, wherein expanding the rendering region comprises expanding the rendering region by at least 20 pixel units in all directions.

* * * * *